Feb. 10, 1953 E. G. HENRY 2,627,685
ILLUMINATED SELECTOR MECHANISM
Filed Aug. 17, 1946 3 Sheets-Sheet 1

INVENTOR.
Earle G. Henry.
BY
Attorney.

Feb. 10, 1953     E. G. HENRY     2,627,685
ILLUMINATED SELECTOR MECHANISM
Filed Aug. 17, 1946     3 Sheets-Sheet 2
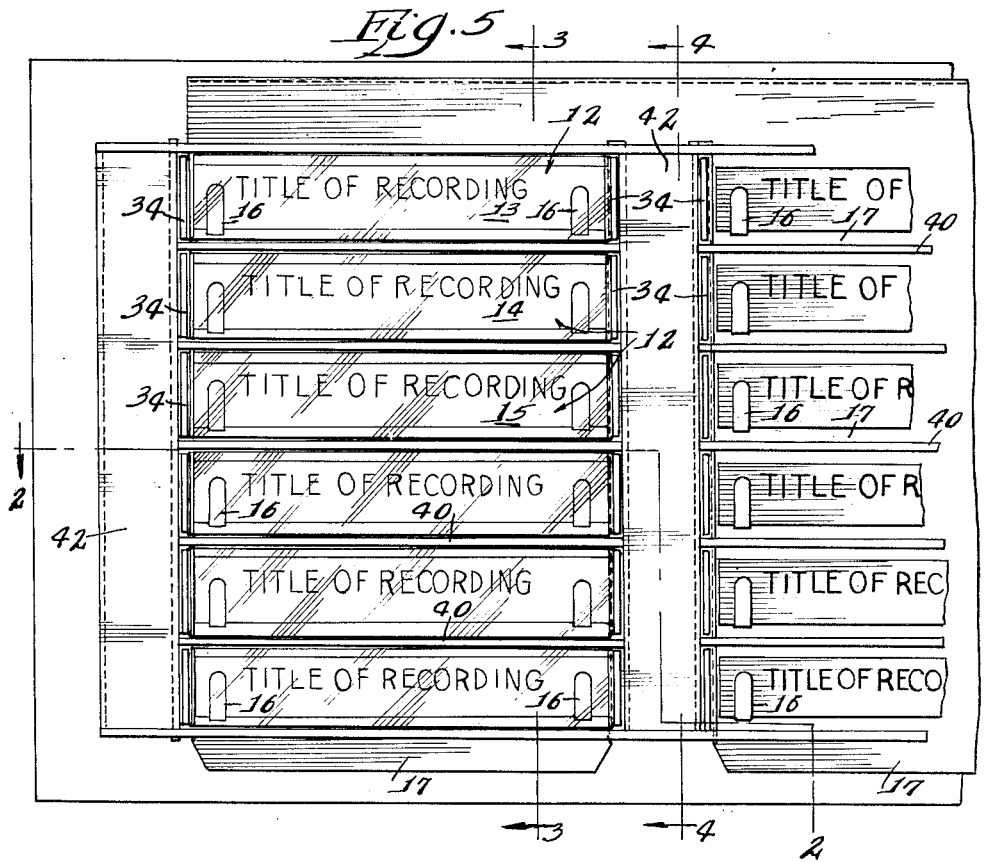
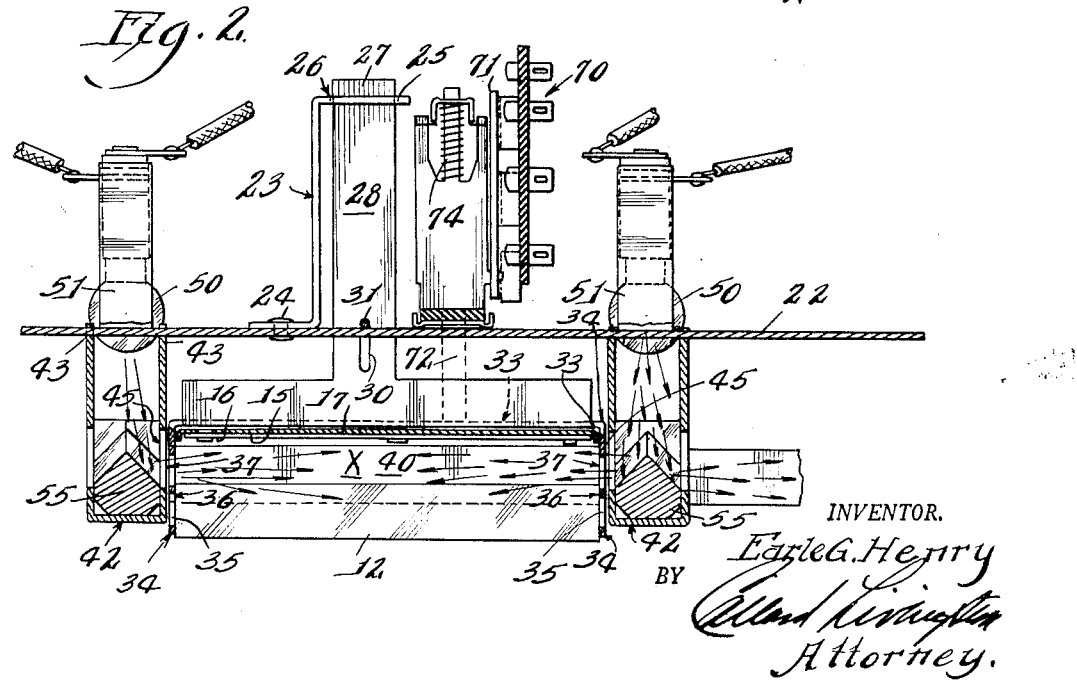
INVENTOR.
Earle G. Henry Feb. 10, 1953 E. G. HENRY 2,627,685
ILLUMINATED SELECTOR MECHANISM
Filed Aug. 17, 1946 3 Sheets-Sheet 3
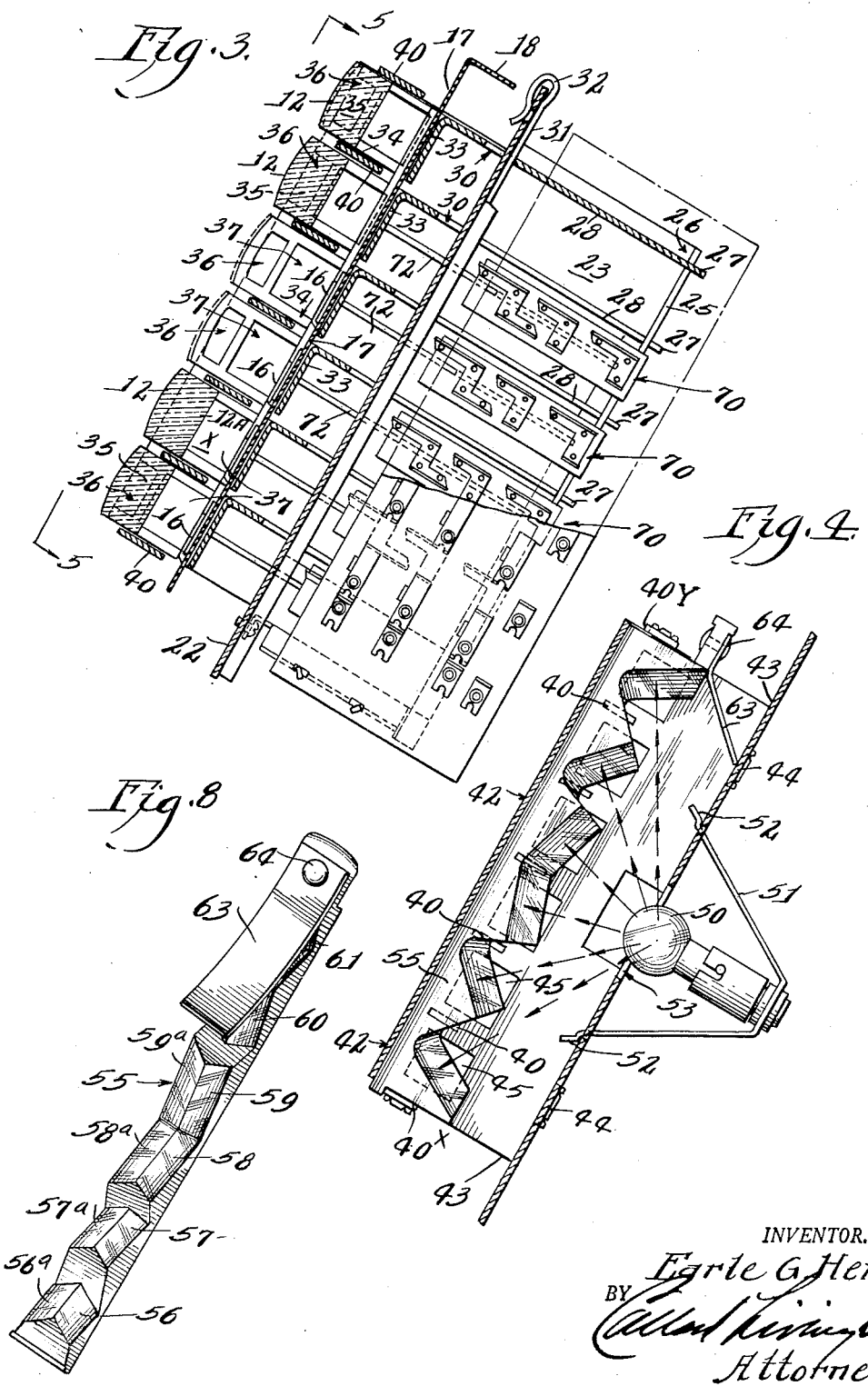
INVENTOR.
Egrle G. Henry
BY
Attorney.

Patented Feb. 10, 1953

2,627,685

UNITED STATES PATENT OFFICE 2,627,685

ILLUMINATED SELECTOR MECHANISM

Earle G. Henry, Chicago, Ill., assignor to Raymond T. Moloney, Chicago, Ill.

Application August 17, 1946, Serial No. 691,299

10 Claims. (Cl. 40—130)

This invention provides a novel illuminated selector mechanism of a type especially, but not exclusively, suited to use with automatic phonographs of the coin-controlled variety.

Features of the novel selector are: the provision of front illumination for title cards; title card holders removable in units and holding a multiplicity of title cards which are individually supported thereby; transparent selector buttons associated with each title card and through which the corresponding title cards are legible by front illumination; front illumination means including reflector units having a multiplicity of reflecting facets angularly disposed to receive light from a single cooperating light source, if desired, to reflect light to the front or title faces of a plurality of title cards.

Additional features and aspects of novelty and utility in the selector mechanism include: the form and means for illuminating the multi-faceted reflector, the latter being a casting with a multiplicity of peculiarly situated reflecting surfaces rendered reflective as a result of plating, for example, and so disposed as to receive light from a single and relatively centrally situated light source, and acting to reflect light in opposite directions and at a plurality of levels corresponding to the positions of a plurality of vertically aligned title cards, for example; to the further provision of a simple means for removably mounting and housing said reflector; to the simplified construction of selector push-button controls having transparent button faces through which title cards may be read; and to the provision of simplified mounting means for said push-button controls and the arrangement of selector switch means coacting therewith.

The structural and functional character of the foregoing features of the invention will become more apparent as the following description proceeds in view of the accompanying drawings in which:

Fig. 2 is a fragmentary horizontal section through the selector means;

Fig. 3 is a vertical section through the selector means looking in the direction of lines 3—3 of Fig. 5;

Fig. 4 is another vertical section through the selector means taken at one of the reflector units as in the direction of lines 4—4 of Fig. 5;

Fig. 5 is a fragmentary front elevational view of the selector means showing the arrangement of title cards and corresponding transparent push-buttons;

Fig. 8 is a perspective of one of the reflector units.

Presently used and other known types of phonograph or analogous selectors are subject to a variety of objections in that they are either difficult to service, confusing to operate, or poorly illuminated, or unsightly, or subject to a combination of such shortcomings.

For example, one known type of selector employs push buttons at the side of printed lists of titles in vertical rows such that it is not always easy to identify the proper button with the desired title where there are several columns of titles, as in a twenty-four record phonograph selector. In other arrangements, title cards are illuminated from the rear, and where the title of the reverse side of the record is carried on such cards, or lists, the lettering is visible therethrough and usually confusing or poorly legible. In still other arrangements, titles are carried individually in button holders and must be inserted and removed by special tools or supplied with transparent protective covers after installation. In many of these known arrangements the changing of an entire program of titles, or the rearrangement thereof to present reverse record-side titles, is laborious and time-consuming.

It will become apparent in view of the following description, that the novel selector means is free from such objections, and affords a very practical, easily serviced and manipulated selector which is particularly useful in conjunction with automatic, coin-controlled, multi-record phonographs, and which is also adaptable to other selector installations of analogous nature.

Figure 1:
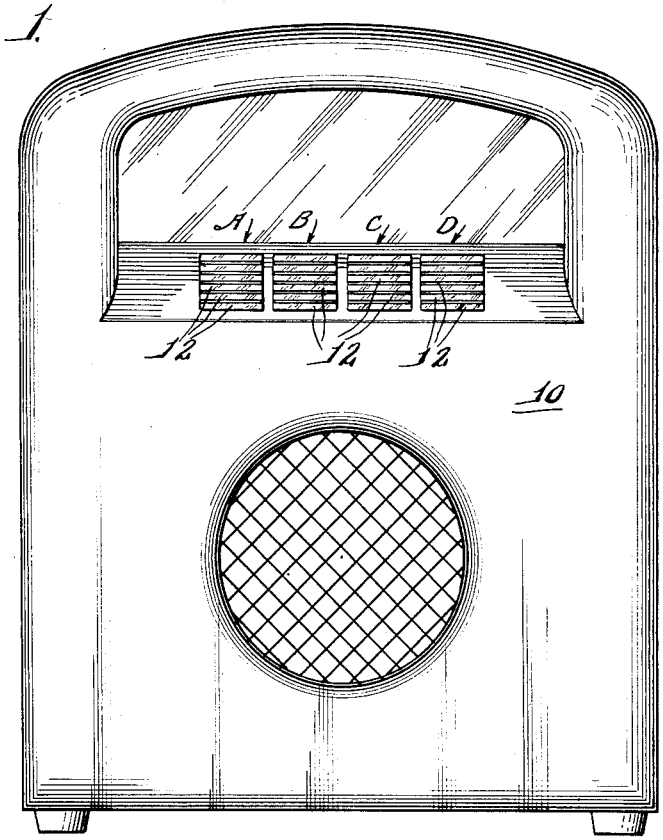
Fig. 1 is a front elevational view of an automatic phonograph equipped with the novel selector means.

The illustrative application of the invention herein shows the device adapted to a multi-record automatic phonograph 10, as in Fig. 1, wherein there are a plurality (for example, twenty-four) elongated selecting push buttons 12 arranged in four vertical columns A, B, C, and D.

Figure 6:
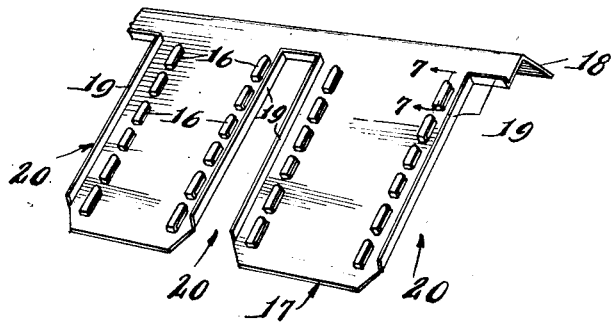
Fig. 6 is a front perspective, to reduced scale, of one of the title card holders.

Behind each of the transparent push buttons 12, as in Fig. 5, is a corresponding record title card 13, 14, 15 . . . etc. each held in pairs of horizontally spaced ears 16 punched up from the surface of a title plate 17 of the form shown in Fig. 6. This title plate 17 is preferably a single stamping of metal accommodating the entire program selection of titles for which the selector is to be used, half of such a plate being shown in Fig. 6, accommodating twelve of twenty-four titles.

Figure 7:
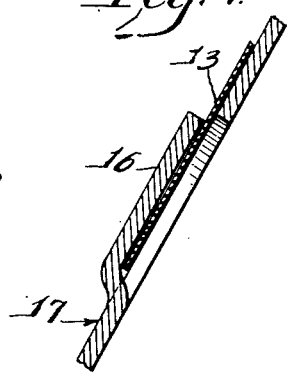
Fig. 7 is an enlarged sectional fragment of a title card and supporting lug on the card holder.

Title plate 17 includes an offset upper edge portion 18 providing a handle portion by which the plate may be grasped for insertion and removal from the selector unit, as will appear; and said plate further includes other upset edge portions 19 bordering cut-outs 20 fitting around certain illuminating means to be described. An enlarged detail of the mounting of a title card 13 in a mounting lug or ear 16 on plate 17, is shown in Fig. 7, which is a section looking in the direction of lines 7—7 of Fig. 6.

Referring to the construction of Fig. 2, the selector unit mechanism includes a metal base plate 22 having a vertically extensive bracket 23 riveted as at 24 to the back thereof with an offset portion 25 spaced rearwardly from the base plate and including a plurality of vertically aligned slots 26 therethrough to slidably receive the tail portions 27 of a push-button tongue 28. This construction also appears to advantage in Fig. 3.

As in Fig. 2, the selector button tongue 28 has a short slot 30 near its passage through a slot in the base plate, and a vertically extensive retaining pin 31 passes down through all similar slots 30 in the remaining push-button tongues in each column, there being preferably six push-buttons in each column; thus, pin 31 limits outward movement of all push-button tongues in the corresponding column. The upper end of pin 31 is hooked over as at 32 onto an upper edge portion of the base plate to secure the same in position; removal of this pin permits withdrawal of all six push buttons in any column.

In Figs. 2 and 3 it will appear that each push-button tongue portion 28 has an integral, down-turned offset portion 33 corresponding in width, laterally of the tongue portion, to the width of the push-button proper, indicated at 12; and said offset further has opposite, outwardly turned flanges 34 completing a U-shaped bracket for retention of the corresponding transparent button portions 12, which are of oblong shape and made preferably from a material such as clear Lucite or any other suitable transparent substance.

At the opposite ends of each transparent button element are rectangular protrusions or bosses 35, Figs. 2 and 3, which fit snugly into correspondingly shaped slots or cut-outs 36 (middle part of Fig. 3 particularly) punched in the mounting offsets or wings 34 on each U-shaped bracket portion of the several push-button structures, whereby the transparent members are securely held in place, it being observed in Fig. 3 that said transparent members have been omitted from the middle to push-button stampings, clearly exposing the slots 33 in the offset wings which receive the mounting bosses on said transparent members, and additionally exposing to view larger cut out portions 37 in said mounting wing portions of each push-button structure, through which light from the hereinafter described reflector means may pass from light sources, at the sides of each column of buttons, onto the front surfaces of the title cards.

Thus, each push-button structure includes an elongated U-shaped bracket having opposite, offset, end wings with light-transmitting slots or cut-outs therein, as well as mounting slots to receive mounting bosses at the ends of the transparent button top or member clamped between said wings, said structure further including a tongue portion slidably supported in base plate 22 and bracket means 23.

Preferably, the thickness of the transparent button tops is appreciably less than the depth of the mounting wings, so that a space X is left between the innermost surface 12A of said transparent members and the title card therebehind, for maximum light transmission from slots 37 to the title cards, as indicated near the bottom button in Fig. 3.

Lateral spacing and reinforcing straps 40, Figs. 3 and 4, pass above and beneath each push-button with their ends staked in sidewall portions of channel shaped reflector housings 42 positioned in the vertical space between each row of buttons, Figs. 2 and 4.

The channel shaped reflector housings 42 have their longitudinal edges 43 fitted against the base plate 22 with ears 44 staked into the latter, as in Fig. 4; and the vertical side walls of these housing members have light slots 45 punched therein for registration with the light passages 37 in the button mounting wings.

Means providing front illumination for the title cards includes a plurality of lamps 50, Figs. 2 and 4, carried on brackets 51 riveted to the base plate as at 52, said lamps being positioned at about the middle of the vertical extent of the columnar arrangement of each set of six push-buttons, which is to say, also, at about the middle of each reflector housing channel 42, there being a light slot 53, Fig. 4, through the base plate before each lamp through which light enters the reflector housing at about the middle thereof.

Means for reflecting light from said lamps or light sources, includes peculiarly shaped reflectors having the configuration illustrated by the reflector unit 55 of Fig. 8, which is in the nature of an elongated metal casting having a longitudinally extensive series of reflecting areas 56, 57, 58 . . . 61, said areas lying respectively in planes having a predetermined reflective angular disposition relative to a common center, which in this case is represented by the light source 50 in Fig. 4, said areas or planar reflective surfaces having oppositely pitched duplicate portions 56a, 57a . . . 61a for reflecting light from the same common center or source sidewise in a direction opposite from that of the first-mentioned series of areas 56 . . . 61. Useful light-reflecting quality is imparted to said areas by polishing the same, preferably by plating the casting, and said areas especially, with nickel or the like.

One of the reflector units 55 is mounted in each housing 42 in the vertical space between each column of row of selector buttons; if there were only one column of six buttons, it would be preferably for maximum illumination to employ two reflector units flanking the vertical margins of said column; but in most automatic phonographs, twenty-four record selections are desired, thus necessitating four columns of push-buttons with six buttons in each column, by reason of which it will appear that one reflector unit between any two such columns will reflect light sidewise in opposite directions toward each of the two said columns; thus, for the four columns A, B, C, D, in the phonograph of Fig. 1, a minimum of three reflector units could be used, but preferably five units would be used for maximum illumination; and in the latter instance, each column would be flanked by a pair of reflector units, in effect.

As will appear from Figs. 2 and 4, the reflector units 55 are dimensioned to fit closely into the channel shaped housings 42; and each reflector unit is provided with a stiff leaf spring 63 riveted thereto as at 64, and adapted to press against the base plate with sufficient force to secure the unit firmly but removably in its housing. Preferably, the bottommost and topmost reinforcing straps 40X and 40Y, Fig. 4, extend all the way across the whole selector assembly, being held by staked ears at top and bottom edges of the channels; and these top and bottom straps provide retaining means for additionally securing the reflector units in their housings cooperatively with their springs 63.

Means cooperative with the individual push-button structures for effecting phonograph record selection control, include selector switches 70, Figs. 2 and 3, one for each button, each having a slidable contact element 71, Fig. 2, moved back and forth by a plunger 72 normally urged outwardly against the corresponding selector stamping portion 33, by spring 74 maintaining the switch in a non-selected condition with the corresponding push-button yieldable to finger pressure to shift switch element 71 in making a program selection through circuit connections with switch means 73 (not shown) in one of several arrangements known in the art and not illustrated herein since such connections do not form part of the invention.

The front illumination of title cards is attractive and effective; confusion in deciding which button to push in making a selection is absent from the novel construction; the number of lamps required for the large number of selections afforded is quite small, simplifying servicing problems; failure of one lamp does not necessarily impair the visibility of a title. The selector unit is compact; it is readily serviced both as to replacement of lamps and title cards; a whole set of titles may be withdrawn at one time; if a whole program is to be changed at one time, the title card holders may be prepared in advance and quickly slipped into position, yet changing of a single title is also quickly and easily done.

The reflector units are relatively inexpensive; they are easily removed for polishing where necessary; the selector button structure is easily assembled and dismantled, and it is also easily assembled in relation to one or more types of selector switch means employing an actuating plunger analogous to the plungers 72. Moreover, the entire selector unit is easily installed in a phonograph since all parts are carried by or united with the main base plate 22, which is ordinarily seated in a suitable slot (not shown) in the phonograph cabinet just behind the door thereof on which the reference character 13 appears in Fig. 1, so that mere opening of this door (customarily locked in usual practice) by the service man, exposes the selector means for such attention as is necessary.

It should be noted in connection with possible modifications of the specifically described form of the invention, that the reflecting surfaces 56, 56a . . . 59, 59a, need not be planar, as shown, but may desirably be curved variously, depending upon clearances, etc. between the buttons and title cards, to procure maximum diffusion.

I claim:

1. Illuminated selector apparatus including a plurality of movable selectors, indicia means which is stationary relative to said selectors and relative to which each selector is movable back and forth, a transparent touch member for each selector by which the latter is engaged for operative movement, and through which corresponding indicia may be read by light reflected from said indicia toward and through the corresponding touch member, a source of light common to all selectors, and means directing light from said source in between each touch member and corresponding indicia for reflection from the latter toward and through the former, by which indicia may be read through the said touch members.

2. Selector mechanism, especially for multi-record phonographs, and comprising selector push-buttons arranged in a column, an elongated transparent block crowning each push-button, the length of said blocks being transverse of the extent of said column such that each block and push-button has a side in alignment at an edge of said column, means mounting each block on its push-button with an inner marginal surface of the block spaced substantially from the corresponding push-button structure to receive a title card holder, a unitary plate having title card engaging means thereon, constituting a title card holder as aforesaid, and fitted in said space between the marginal surfaces of said blocks and the push-buttons, light-transmitting portions in each aligned side aforesaid of each push-button, a light source at the aforesaid edge of said column, a compound reflector directing light from said source into the light-transmitting portions aforesaid for illumination of title cards in said holder whereby the latter may be read through corresponding transparent blocks, and phonograph-selector control means actuated by said push-buttons.

3. Mechanism as defined in claim 2 and further characterized by the provision of at least two columns of said selector push-buttons arranged side by side with said light source and said reflector disposed in a space between said columns, said reflector directing light from said source in opposite directions into the said light-transmitting portions of both columns.

4. In a selector mechanism, push-buttons arranged in a column, selecting means actuated by said push-buttons, a transparent face member carried by each push-button with an inner surface spaced substantially from confronting portions of the corresponding push-button and providing a title space, a unitary light source arranged at one side, at least, of said column, a compound reflector having a plurality of reflecting facets disposed at various angular positions relative to said source and each, at least, reflecting light from said source into the title space of each push-button, a title carrying member removably disposed in the title spaces of the several push-buttons and adapted to hold title means in reading alignment with each said transparent face member to be read through the latter by light reflected therefrom, at least, from the aforesaid reflected source light in the corresponding title space.

5. In an illuminated selector device, a plurality of selector elements reciprocable in parallelism and normally to a common plane, a transparent member carried by each selector element with an inner surface spaced from the corresponding selector element and an outer surface disposed for manual engagement for actuation of the corresponding selector element, said surfaces lying in planes approximately paralleling said common plane, a unitary title holder common to all said transparent members and disposed substantially in the several spaces between the several selector elements and the corresponding inner surface portions of said transparent members, light-transmitting areas at the same side of each selector element communicating into the corresponding spaces between the same and corresponding inner surface portions of said transparent members, whereby light may enter said spaces from said same sides to illuminate title indicia carried by said holder, and unitary, plural-surface light directing means with a unitary light source situated at said same sides directing light into said light-transmitting areas to illuminate all said title indicia for all selector elements so that said indicia may be read through said transparent members from the said outer surfaces thereof.

6. Illumination means for selector mechanisms and comprising a unitary and axially elongated member having formed thereon a multiplicity of planar reflecting surfaces arranged to follow one after another along said axis and pitched variously relative to each other and also to said axis relative to a source of light common thereto and reflecting light laterally of said axis from said source toward a plurality of areas situated along an axis at one side, at least, of said unitary member.

7. Illumination means as defined in claim 6 and further characterized in that each of said reflecting surfaces has a duplicate surface adjacent thereto but pitched oppositely therefrom, whereby light from said source is reflected toward said areas on opposite sides of said axis of the unitary member.

8. A reflector in the form of an elongated unitary member having a multiplicity of integrally formed reflecting surfaces disposed serially along the direction of its lengthwise axis, no two of said surfaces lying in the same plane, said surfaces respectively having an angular disposition relative to each other and said axis and relative to a common point situated opposite a median part of said unitary member for reflecting light from a source laterally opposite said common point in a plurality of directions lateral to said axis.

9. A unitary multi-facet, reflecting device for use with illuminated indicia devices, said reflecting device comprising a long body having a plurality of pairs of oppositely pitched reflecting surfaces arranged in saw-tooth fashion serially along its lengthwise axis, each said pair of surfaces also being pitched relative to a central point opposite a mid-region of said body and axis corresponding to the position of a light source common to all said surfaces, such that the latter will respectively reflect light from a said source in opposite directions laterally relative to said axis and along paths in approximate parallelism thereto.

10. In a selector mechanism of the type having a plurality of pushable selector members arranged in a column and a horizontally-extensive transparent touch member for each selector member, illuminated title means comprising, to wit: means located behind and in inwardly spaced relation to all of said touch members for holding a printed title behind and spaced from each said touch member to be read therethrough; a light situated at one side of the touch members of said column about midway between the ends of the column, and sidewise reflecting means in the form of an elongated straight bar mounted at said side of the column with its mid-region substantially opposite and rearward of said light, said bar having formed therein along its length a series of reflecting planes each disposed opposite the space between one of said touch members and the appertaining title and pitched relative to said space and said light to direct light sidewise into said spaces such that all of said titles are illuminated from the side by the light for reading forwardly through their respective transparent touch members.

EARLE G. HENRY.

REFERENCES CITED

The following references are of record in the file of this patent:

UNITED STATES PATENTS

| Number | Name | Date |
|---|---|---|
| 859,199 | Chinnery | July 9, 1907 |
| 1,430,147 | Beville | Sept. 26, 1922 |
| 1,644,084 | Reinke | Oct. 4, 1927 |
| 1,649,547 | Schnormeier | Nov. 15, 1927 |
| 1,698,279 | Schimpff | Jan. 8, 1929 |
| 1,846,476 | Degenhart et al. | Feb. 23, 1932 |
| 1,911,337 | Aldrich | May 30, 1933 |
| 1,954,978 | Aldrich | Apr. 17, 1934 |
| 2,265,124 | Andres | Dec. 9, 1941 |
| 2,417,704 | Rylsky | Mar. 18, 1947 |